G. W. BUNGAY.
SHIFTING MECHANISM FOR VARIABLE SPEED GEARING.
APPLICATION FILED AUG. 22, 1913.

1,193,986.

Patented Aug. 8, 1916.
2 SHEETS—SHEET 1.

Attest:

Inventor: George W. Bungay
by Frank T. Wentworth
his Atty.

UNITED STATES PATENT OFFICE.

GEORGE W. BUNGAY, OF NEW YORK, N. Y., ASSIGNOR TO BUNGAY MFG. COMPANY, A CORPORATION OF NEW YORK.

SHIFTING MECHANISM FOR VARIABLE-SPEED GEARING.

1,193,986.  Specification of Letters Patent.  Patented Aug. 8, 1916.

Application filed August 22, 1913. Serial No. 786,057.

*To all whom it may concern:*

Be it known that I, GEORGE W. BUNGAY, a citizen of the United States, residing in the borough of Brooklyn, in the city of New York, county of Kings, and State of New York, have invented certain new and useful Improvements in Shifting Mechanisms for Variable-Speed Gearing, of which the following is a specification, reference being had therein to the accompanying drawings, which form a part thereof.

My invention relates to a shifting mechanism for variable speed gearing, and more particularly to a mechanism which will act automatically to shift the gears in a manner determined by a controller adapted to be set prior to the actuation of this gearing by said mechanism.

The main object of my invention is to provide a shifting mechanism for variable speed gearing wherein the gears may be set for each speed by a similar movement, or sequence of movements, the actual shifting of the gears being automatically effected independently of a controller for determining and defining the movement of the gears under the control of said mechanism, thus relieving the operator of the necessity for manually shifting the gears to a variable extent, or selectively, to control the speed of the mechanism driven through said gearing.

A further object is to provide such a shifting mechanism wherein the gears may be set for variance in the speed or direction of drive, by the same mechanical parts, the operative effect of which parts will be determined by a controller located adjacent the operator.

A still further object is to provide such a shifting mechanism wherein the movement of the parts effecting the shifting of the transmission gears will be synchronized with that of the clutch connecting the said gears with the engine, to avoid a possible shifting of the gears while the clutch is set.

A still further object is to provide such a mechanism wherein the actuation of the gear shifting mechanism will be controlled by and simultaneously with the actuation of the pedal controlling the clutch mechanism, the operative effect of said pedal upon the clutch and upon the shifting mechanism being so timed as to insure the meshing of the coöperating gears prior to the setting of the clutch, and the release of the clutch prior to the disengagement of said gears.

A still further object is to provide such a mechanism wherein the gears will be automatically disengaged each time the clutch is fully released.

A still further object is to provide such a mechanism wherein, if desired, the energy necessary to effect the shifting of the gears will be developed by the power applied to the clutch pedal in releasing the clutch.

A still further object is to provide such a mechanism wherein the movable members to which the shifting power is applied are adapted to be selectively connected to the shifting rods by means of rotary connecting disks so constructed as to cause and permit movement of said rods respectively in either direction, as determined by the means for rotating said disks operated by the controller.

A still further object is to provide such a mechanism wherein a connecting disk having no operative effect upon either of said gear shifting rods, will be operative to prevent a sliding movement of its member, thus insuring the application of the full power for shifting the gears to the member operative with relation to a shifting rod.

A still further object is to prevent rotary movement of the connecting disks while the gears are enmeshed, with a resultant loss in the operative relation of the disks and the shifting rods.

A still further object is to provide such a shifting mechanism wherein each connecting disk will be maintained in the operative relation to the members coöperating therewith carried by the shifting rods respectively, while being held out of contact with each other during those times when rotary movement of said disks is necessary to set them preparatory to shifting the gears. And a still further object is to provide such a mechanism wherein, if desired, a single spring may be used to effect movement of both shifting rods in both directions.

The invention consists primarily in a shifting mechanism for variable speed gearing embodying therein a shifting rod adapted to impart variable movement to a movable member of a transmission gear system, actuating means having a normal tendency to move said rod, connections between said means and means operative to set and release an engine clutch, whereby said means are permitted to operate when the clutch is set and are restored to normal when the clutch is released, selectively operative means whereby the operative effect of said actuating means upon said rod may be predetermined, and a controller for operating said last named means; and in such other novel features of construction and combination of parts as are hereinafter set forth and described, and more particularly pointed out in the claims hereto appended.

Referring to the drawings.

Like letters refer to like parts in all of the several views.

In the embodiment of my invention shown in the drawings, I have illustrated a construction applicable for use in connection with a variable speed gearing transmission system in which the movable gears are mounted upon two slidable shafts, and I will describe a construction adapted for use with this particular type of gear transmission system, although it is to be understood that my invention is applicable to other types of speed boxes embodying movable gears slidably mounted. The type of transmission gearing referred to is used for securing three speeds ahead and a reverse, through the movements of each movable gear shaft in two directions.

Figure 1:
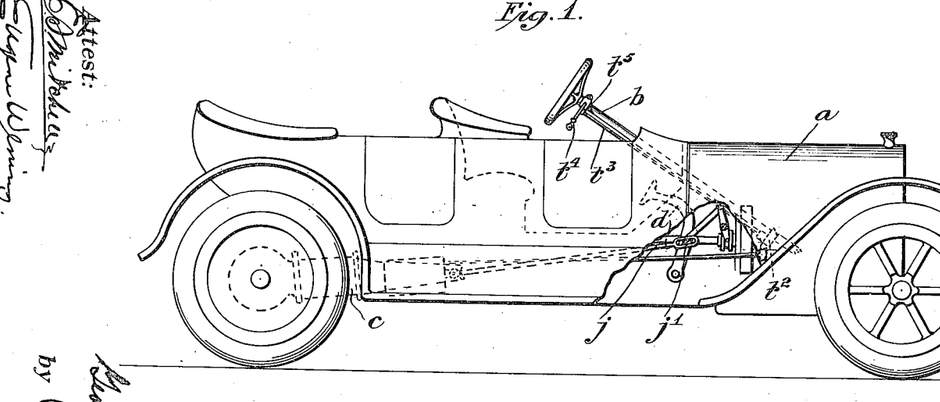
—Figure 1 is a side view of an automobile, showing conventionally the application of my improved mechanism thereto.

In the embodiment of my invention shown in the drawings, $a$ indicates an automobile, provided with a steering head $b$, and a variable speed transmission gearing indicated at $c$ upon Fig. 1 of the drawings.

At $d$ I have shown an ordinary clutch lever and pedal controlling the engine clutch in the usual and well known manner, said clutch mechanism not being shown as the same is old and well known in the art and forms no part of this invention.

The movable members of the gearing $c$ are adapted to be shifted by means of shifting rods $e$ and $f$, said rods being adapted to slide back and forth to bring the various intermediate gears of the transmission gearing into the desired operative relation to the driving and driven gears. These rods $e$ and $f$ may form extensions of, or be connected in any desired manner to, the movable shafts of the gear box.

Supported adjacent the gear box $c$ is a casing $g$ in which the rods $e$ and $f$ are slidably mounted, which casing has mounted therein actuating means having a normal tendency to move said rods, consisting in the form of the invention shown, of the oppositely disposed members $h$ $i$, through which the requisite movement of the rods $e$ and $f$ to secure the desired shifting of the gears, is automatically accomplished. These members are normally held inoperative relative to the said shifting rods $e$ and $f$, means being provided in connection with each, whereby the force exerted through said members may be applied to either of said rods to impart movement thereto in either direction, as determined by a controller, operative from adjacent the steering head $b$. In connection with said members, I also provide means whereby as the engine clutch is released, the rods $e$ and $f$, will be brought to normal or with the intermediate gears in the neutral position as to the driving gears of the gear transmission system, and the movement of said intermediate gears, when coming into mesh with the driving gears, may be controlled by the same mechanism controlling the engine clutch.

Slidably mounted in the casing $g$ is a rod $j$, extending parallel with the shifting rods $e$ and $f$, one end of which rod $j$ is connected to the lever carrying the clutch pedal $d$, an elongated slot $j'$ being provided therein to permit that movement of the pedal $d$ in excess of any movement of the said rod necessary to permit the meshing of the gears of the transmission gearing prior to the setting of the engine clutch, or the disengagement of said gears subsequent to the release of said clutch, thus minimizing any likelihood of the stripping of gears due to an improper timing of the actuation of the clutch mechanism and of said gears. The members $h$ and $i$ are slidably mounted upon this rod $j$ within the casing $g$, and said rod is provided with means as the cross head $j^2$, the links $j^3$ $j^4$, the block $k$ and levers $j^5$ $j^6$, pivotally connected to said links $j^3$ $j^4$, and to said block $k$, and moving upon the intermediate pivots $j^7$ and $j^8$ carried by the arms $j^9$ and $j^{10}$, supported by the casing $g$, for imparting simultaneous movement to the members $h$ and $i$ in opposite directions, with the movement of the rod $j$ in one direction, and the disengagement of said cross head and said block from said members upon the movement of said rod in the opposite direction, to permit the automatic movement of either of said members. The members $j^2$ and $k$, as will more fully appear hereinafter, also serve to bring the rods $e$ and $f$ to a neutral position each time the engine clutch is released.

Figures 2, 3, 6:
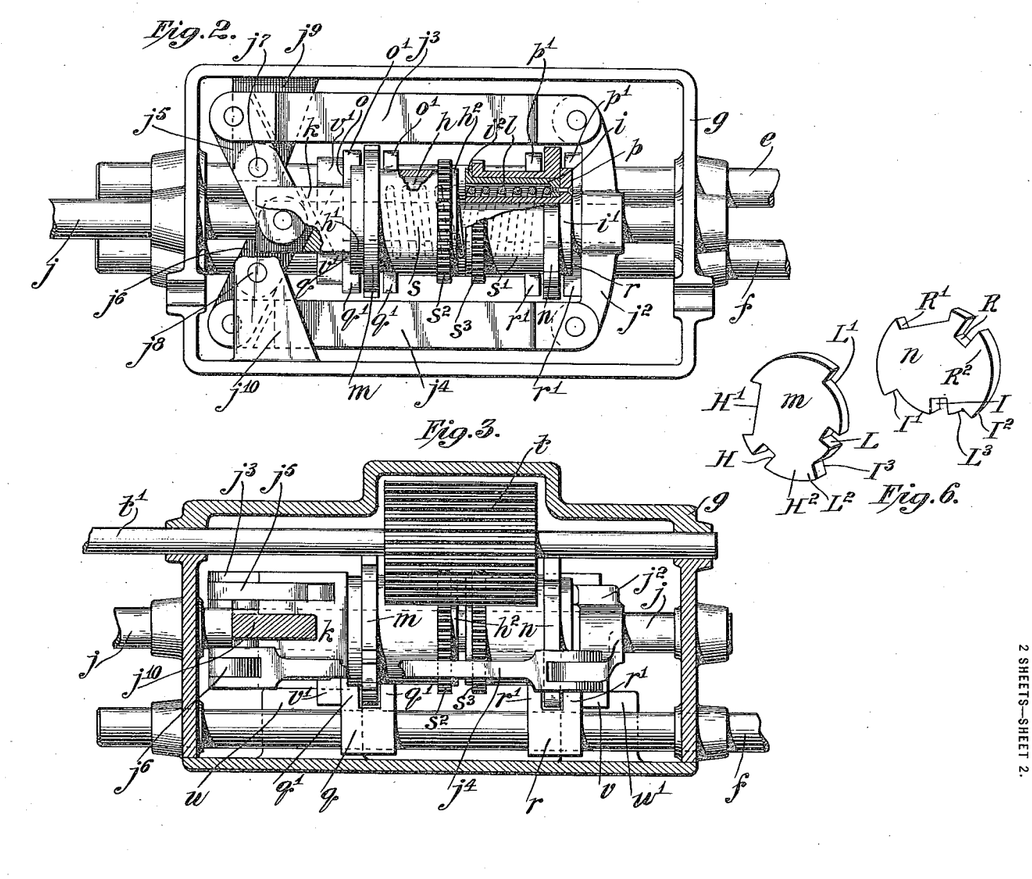
Fig. 2 is a plan view, partly in section, of my mechanism with the cap of the casing and the controller gear removed.
Fig. 3 is a vertical longitudinal section through the casing, showing the mechanism in elevation.
Fig. 6 is a perspective view illustrating diagrammatically the operation of the connecting disks.
Figure 4:
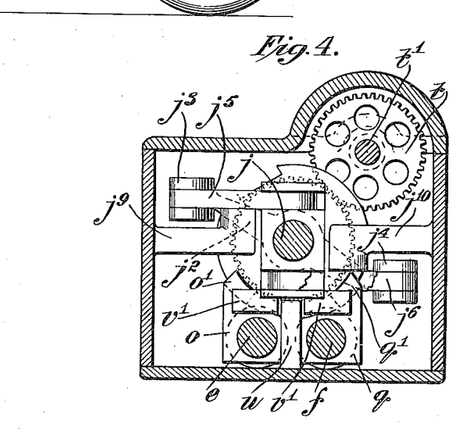
Fig. 4 is an end elevation of said mechanism with parts thereof broken away to more clearly disclose the relation of parts.
Figure 5:
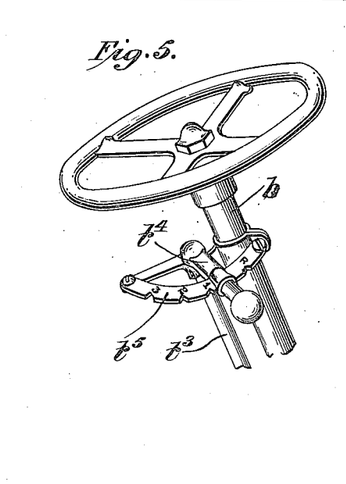
Fig. 5 is a detail view of the steering head, showing the lever of the controller attached thereto.

The members $h$ $i$ are independently movable axially of the rod $j$ under the control of an elastic medium normally tending to force these members in opposite directions, means being provided whereby movement of either or both of said members may be prevented to control the operative effect of said elastic medium. In the accompanying drawings, this elastic medium is shown as being a coil spring $l$, the ends of which respectively are seated in channels formed in the members $h$ and $i$, as shown in Fig. 2 of the drawings, the members $h$ and $i$ being both of the same construction. The normal tendency of said spring will be to force said members $h$ $i$ away from each other, but, by providing means preventing movement of one of said members while permitting movement of the other, the full energy of said spring may be applied to the last named member. In other words, by employing a single spring such as $l$, I am enabled to secure the desired quantity of movement of either of the members $h$ $i$, but in opposite directions, through the controlling means defining the movements of said members. Hence, by providing each of the members $h$ $i$ with connecting means adapted to be selectively brought into the operative relation with coöperating means upon the rods $e$ and $f$, I am enabled to utilize one of these members, as $h$, for imparting movement to either of the rods $e$ and $f$ in one direction, and the other member, $i$, for imparting movement to either of said rods in the opposite direction. This connecting means comprises the connecting disks $m$ $n$ rotatably mounted upon the members $h$ and $i$ respectively, and the forked blocks, $o$ $p$, carried by the rod $e$, and $q$ $r$, carried by the rod $f$, the arm $o'$ $p'$ $q'$ and $r'$ of which blocks are adapted to straddle said disks $m$ $n$ and be engaged by contact surfaces thereon, or passed through clearances formed upon said disks in order to secure the desired combination of movement of said rods either with said disks or independently thereof.

The connecting disks $m$ $n$ are carried respectively by the cylinders $s$ $s'$, having secured thereto the gears $s^2$ and $s^3$, in mesh with the elongated gear $t$, carried by the shaft $t'$ and forming a part of the controller or controlling mechanism by means of which the connecting disks may be set so as to secure the desired operative effect of the elastic medium upon either of the rods $e$ $f$.

The rod $t'$ is rotated by means of the gears $t^2$ indicated to the right of Fig. 1, which gears are controlled by the shaft $t^3$ provided with an operating lever handle $t^4$ supported adjacent the segment $t^5$ and carried by the steering head $b$.

To insure the proper application of the power of the spring $l$ to the connecting disks $m$ $n$, these disks and their appurtenances are mounted respectively between the end flanges $h'$ $h^2$ upon the member $h$, and $i'$ $i^2$, upon the member $i$.

To prevent axial movement of either or both of the connecting disks $m$ $n$, when desired, I provide the guide stops $u$ and $u'$, adapted to coöperate respectively with the said connecting disks to prevent or permit movement of said disks in either direction, and movement of either rod $e$ $f$ which at the moment is operatively connected with the actuating means by one of said disks. These guide stops have the further and incidental functions of preserving the proper relative position of the disks $m$ $n$, and the connecting blocks $o$ $p$ $q$ $r$ and of relieving the cross head $j^2$ and block $k$ from any tendency to rotate.

To prevent frictional engagement of the disks $m$ $n$ with the blocks $o$ $p$ $q$ $r$ during the time when it is desired to set the disks by means of the gear $t$, I provide the cross head $j^2$ and block $k$ with pendant lugs $v$ $v'$ respectively, which lugs straddle the stop guides $u$ $u'$ and are adapted to engage the blocks $o$ and $p$, $q$ and $r$ respectively, and cause movement of said shafts $e$ $f$ independently of and to a slightly greater extent than the movement of said members $h$ $i$ so as to provide clearance between each of said disks and the arms $o'$ $p'$ $q'$ and $r'$ of each of said blocks.

The connecting disks $m$ $n$ being spaced apart, and each being adapted to be operative upon both rods $e$ $f$, it is necessary not only to construct said disks so as to permit them to move along the guide stops $u$ $u'$, but also to permit one of said disks to move with a rod $e$ or $f$ while the other disk and the other rod remain fixed. This I accomplish by providing each of said disks with a sequence of slots and clearances, the former being adapted to permit the disk to move along its guide stop, and the latter to permit the disk to move clear of the coöperating block upon one rod $e$ or $f$ when operatively engaged with that upon the other of said rods, or permit the block coöperating with one disk to pass clear thereof when the other block on the same rod is operatively engaged by its disk. The general layout of these connecting disks may be simply described as follows:—Each disk has a plurality of slots therein adapted to straddle its stop guide, a contact surface adapted to engage a shifting rod block being provided on one side thereof, and clearance space being provided for the block upon the other shifting rod, upon the other side thereof. The oppositely disposed disks have simultaneous movement in setting and in assembling the device, these disks are so set that when a slot of one disk is alined with its stop guide, that of the other disk is spaced away from its stop guide so as to bring the disk in engagement therewith in a manner to prevent movement of the disk; and when the contact surface adjacent said slot is engaging a block on one shifting rod, a clearance space of the other disk will be so positioned with relation to the other block on said rod as to permit said block to move past said disk. In other words, the slots and clearances of one disk will be alined with solid or contact portions of the other disk. Incidentally, it will be noted that both disks, at all times when a slot is not alined with a guide stop, will be so held as to prevent movement thereof, or of either shifting rod, thus affording a "neutral" position intermediate each succeeding slot.

The specific arrangement of the slots and clearances will be determined by the particular arrangement of the gears of the transmission gearing.

In the invention shown, the disk $m$ is provided with two slots L and H, adapted respectively to be alined with the abutment $u$ for the low and the high speeds, a clearance L' and contact $L^2$ being provided upon opposite sides of the slot L, and the clearance H' and contact $H^2$ being provided upon opposite sides of the slot H.

The disk $n$ is provided with two slots I and R, indicating respectively the intermediate speed and the reverse, the slot I having on opposite sides thereof, the clearance I' and contact $I^2$, and the slot R having upon opposite sides thereof the clearance R' and contact $R^2$.

In addition to the foregoing slots and clearances, the disk $m$ is provided with a clearance $I^3$ substantially opposite to the contact $I^2$, and the disk $n$ is provided with the clearance $L^3$ substantially opposite the contact $L^2$.

The various clearances are of a depth less than the various slots, so that a portion of the disk within said clearances will engage the guide stops $u$ or $u'$, as the case may be, thus locking the said disks at all times excepting when one of the slots L, I, H and R is alined with its guide stop $u$ or $u'$. The slots, to insure the operation of the device by a sequence of similar movements, are arranged equidistant from each other, the slots in the disks $m$ and $n$ being alternated at sixty degrees apart.

The segment $t^5$ is provided with a sequence of notches as shown for indicating the stopping point of the lever $t^4$ to secure any desired setting of the shifting mechanism.

The operation of the herein described shifting mechanism is substantially as follows:—Assuming that the engine is running and the clutch lever and pedal $d$ elevated as shown in Fig. 1, the clutch will be set and the driving members of the transmission gear will be running. Under these conditions, the elastic medium or spring $l$ will be under compression and some portion of the connecting disks $m$ and $n$ will be abutting against the guide stops $u$ and $u'$ by reason of the fact that the controller consisting of the lever $t^4$ and the parts actuated thereby, occupies a neutral position. Under these conditions, the shifting rods $e$ and $f$ will be centered within the box $g$ so that the movable or intermediate gears of the transmission gearing will be disconnected from any driving or driven gears. The rod $j$ will also be thrust forwardly so as to permit a partial depression of the pedal and lever $d$. When it is desired to connect the engine with the driving gearing, the pedal and lever $d$ are depressed until the pin upon said lever, traveling in the slot $j'$, engages the end of said slot, at which time the clutch will be disengaged, or the engine disconnected from the driving gears of the transmission gearing, and thereafter, the rod $j$ drawn forwardly, carrying with it the cross head $j^2$ and forcing the block $k$ toward said cross head until the parts are in the position shown in Figs. 2 and 3 of the drawings. The controller is then set at L or at R, as the case may be, or at any speed at which it is desired to run the driving gearing, and the lever and pedal $d$ permitted to rise under the control of the operator's foot. Assuming that the controller is set at L, the act of setting the controller will rotate the shaft $t'$ through the gears $t^2$, and shaft $t^3$, thus turning the gear $t$ and with it the cylinders $s$ $s'$ and connecting disks $m$ $n$, so as to bring the slot L into alinement with the guide stop $u$, the contact $L^2$ in engagement with the block $o$, the clearance L' over and about the block $q$, and the clearance $L^3$ over and about the block $p$. Hence the member $h$ will be in operative connection with the shifting rod $e$ while being inoperative as to the rod $f$, and the rod $e$ will be permitted to slide freely past the connecting disk $n$ upon the member $i$, while this disk is in engagement with the inner end of the guide stop $u'$. Hence, as the pedal and lever $d$ are permitted to rise, the elastic medium or spring $l$ will exert its entire energy upon the member $h$ and impart a sufficient movement thereto and to the rod $e$ in operative connection therewith through the disk $m$ and block $o$, to bring the desired intermediate gears of the transmission gearing into mesh with the desired coöperating gears of said gearing. If the teeth of the intermediate gears abut against, instead of coming to mesh with, the teeth of the said gears, the pedal $d$ may be again depressed, the controller set at some neutral point, and the clutch permitted to reset so as to change the position of the driving gears of the transmission mechanism, whereupon the operations above referred to are repeated so as to bring the intermediate gears into mesh with the driving gear for the desired speed. While the disk $m$ is moving axially of the rod $j$, to accomplish this shifting of gears, the slot L is astride the guide stop $u$ so that as long as any of the intermediate gears of the transmission gearing are in mesh, the controller cannot be actuated to turn said connecting disk and thus disturb its position with relation to either block $o$ or $q$.

It will be observed that the shifting of the gears is accomplished automatically under the energy of the elastic medium or spring $l$, although the setting of the device is manual.

The gears will be shifted while the pin of the lever and pedal is still in engagement with the end of the slot $j'$, and before the engine clutch has set, the movement of said pin in said slot subsequent to the setting of the gears permitting excess movement of said lever and said pedal to accomplish the setting of said clutch.

When it is desired to change the speed of the driving gear, the pedal and lever $d$ are depressed, the first stage of the movement releasing or throwing out the clutch, while the final stage thereof throws the rod $j$ forward and with it the cross head $j^2$, which, through the link and lever mechanism described, forces the block $k$ toward the cross head $j^2$, carrying with it the member $h$ and its connecting disk $m$.

Inasmuch as the disk $m$ is straddled by the arms $o'$ of the block $o$, the return movement of the disk $m$ will result in a return movement of the shaft $e$, or a restoration of all of the parts to normal. The lugs $v'$ will impart slight excess movement to the rod $e$ so as to hold the blocks $o$—$p$ clear of the disk $m$ when the parts are at normal The gear $t$ is elongated so as to cause it to remain in mesh with each of the gears $s^2$ $s^3$ at all times, thus avoiding any possibility of a loss of adjustment between the connecting disks and the controller.

It will be observed that the slot $j'$ in depressing the lever and pedal $d$ permits sufficient movement of said pedal to release the clutch or throw it out, before the rod $j$ is actuated by said lever and pedal to disengage the intermediate gears of the transmission gearing, thus insuring the meshing and disengagement of said gears only at a time when said clutch is not set.

The operations above referred to are repeated at each change of speed and at the reverse, and to avoid unnecessary prolixity in this specification, while making the operation of the mechanism clear, the position of the connecting disks $m$ and $n$ at the high and intermediate speeds and the reverse will be described without repeating those operations incidental to the actual shifting of the rods $e$ and $f$.

When the controller is set for the intermediate or second speed, the slot I of disk $n$ will be alined with the guide stud $u'$ with the contact $I^2$ engaging the block $r$, the clearance $I'$ alined with the block $p$, and the clearance $I^3$ of the disk $m$ in alinement with the block $q$, thus permitting the rod $f$ to be thrust to the right of Figs. 2 and 3, the disk $m$ being engaged with the guide stop $u$ for directing the energy of the elastic medium or spring $l$. When setting for the high or third speed, the slot H will be alined with the guide stop $u$, with the contact surface $H^2$ in engagement with the block $q$ and the clearance $H'$ above and about the block $o$, the clearance $I'$ being above and about the block $r$, and the disk $n$ engaging the stop $u$, thus directing the application of the energy of the elastic medium or spring $l$, and permitting a free movement of the rod $f$ in a direction opposite to that in which it is moved by the disk $m$. When the mechanism is set at reverse, the slot R will be alined with the guide stop $u'$, the contact surface $R^2$ will engage the block $p$ and the clearance space $R'$ will be above and about the block $r$, the clearance $L'$ on the disk $m$ being above and about the block $o$ and the disk $m$ engaging the abutment $u$ so as to direct the application of the elastic medium or spring $l$ and permit the rod $e$ to be shifted in a direction opposite to that in which it is shifted for the low or first speed.

From the foregoing description it will be apparent that by my mechanism I employ two shifting rods with a single actuating mechanism common thereto, which mechanism may be selectively operative so as to impart a movement in either direction to either of said rods, and that the energy for accomplishing this automatic movement of said rods may be developed through the mechanism for setting or releasing the engine clutch and may be controlled through the clutch pedal so as to prevent a too rapid movement of said rods. Furthermore, it will be clear that these rods cannot be shifted either to throw the intermediate gears of the transmission gearing into or out of mesh, while the engine clutch is set.

While I have shown a particular embodiment of my invention applicable to a certain type of variable speed transmission gearing, it is not my intention to limit the invention to application to that particular type, nor to those particular details of construction which adapt it to that particular type of gearing.

I believe it to be broadly new to provide a mechanism of this character wherein the operative effect of the means acting upon the shifting rods is determined by a controller, the actual operation of said means being automatic and being so timed with relation to the clutch mechanism as to prevent movement thereof while said clutch is set. I also believe it to be broadly new to provide means between an automatically operating actuating member and a plurality of shifting rods, whereby said connecting means may be selectively actuated or set in a manner to determine the operative effect of said actuating means upon said rods.

Having described my invention, what I claim as new and desire to have protected by Letters Patent, is:—

1. A shifting mechanism for variable speed gearing embodying therein an engine clutch, means operative to set and release said clutch, a shifting rod adapted to impart variable movement to a movable member of a transmission gear system, actuating means having a normal tendency to move said rod, connections between said means and the means operative to set and release the engine clutch, whereby said means are permitted to operate when the clutch is set and are restored to normal when the clutch is released, selectively operative means whereby the operative effect of said actuating means upon said rod may be predetermined, and a controller for operating said last named means.

2. A shifting mechanism for variable speed gearing embodying therein an engine clutch, means operative to set and release said clutch, a shifting rod adapted to impart variable movement to a movable member of a transmission gear system, actuating means having a normal tendency to move said rod, connections between said means and the means operative to set and release the engine clutch, whereby said means are permitted to operate when the clutch is set and are restored to normal when the clutch is released, means whereby the movements of said actuating means are timed with relation to the movements of said means for controlling said clutch, whereby said actuating means are inoperative to move said rod while the clutch is set, selectively operative means whereby the operative effect of said actuating means upon said rod may be determined, and a controller for operating said last named means.

3. A shifting mechanism for variable speed gearing embodying therein an engine clutch, means operative to set and release said clutch, a shifting rod adapted to impart variable movement to a movable member of a transmission gear system, actuating means having a normal tendency to move said rod, connections between said means and the means operative to set and release the engine clutch, whereby said means are permitted to operate when the clutch is set and are restored to normal when the clutch is released, selectively operative means whereby the operative effect of said actuating means upon said rod may be predetermined, means independent of said connections whereby said actuating means may be made inoperative, or held in a neutral position, and a controller for operating said selectively operated means.

4. A shifting mechanism for variable speed gearing embodying therein an engine clutch, means operative to set and release said clutch, a shifting rod adapted to impart variable movement to a movable member of a transmission gear system, actuating means having a normal tendency to move said rod, connections between said means and the means operative to set and release the engine clutch, whereby said means are permitted to operate when the clutch is set and are restored to normal when the clutch is released, means whereby the movements of said actuating means are timed with relation to the movements of said means for controlling said clutch, whereby said actuating means are inoperative to move said rod while the clutch is set, selectively operative means whereby the operative effect of said actuating means upon said rod may be predetermined, means independent of said connections whereby said actuating means may be made inoperative, or held in a neutral position, and a controller for operating said selectively operative means.

5. A shifting mechanism for variable speed gearing embodying therein an engine clutch, means operative to set and release said clutch, a plurality of shifting rods adapted respectively to impart variable movement to movable members of a transmission gear system, actuating means having a normal tendency to move both of said rods, connections between said means and the means operative to set and release the engine clutch, whereby said means are permitted to operate when the clutch is set and are restored to normal when said clutch is released, selectively operative means common to both of said rods, whereby the operative effect of said actuating means upon said rods may be predetermined, a controller for said last named means, and means carried by said rods respectively and adapted to be acted upon by said selectively operative means whereby said rods respectively may be moved in either direction under the control of said selectively operative means.

6. A shifting mechanism for variable speed gearing embodying therein an engine clutch, means operative to set and release said clutch, a plurality of shifting rods adapted respectively to impart variable movement to a movable member of a transmission gear system, actuating means having a normal tendency to move both of said rods, connections between said means and the means operative to set and release the engine clutch, whereby said means are permitted to operate when the clutch is set and are restored to normal when said clutch is released, means whereby the movements of said actuating means are timed with relation to the movements of said means for controlling said clutch, whereby said actuating means are inoperative to move said rods while the clutch is set, selectively operative means common to both of said rods, whereby the operative effect of said actuating means upon said rods may be predetermined, a controller for said last named means, and means carried by said rods respectively and adapted to be acted upon by said selectively operative means, whereby said rods respectively may be moved in either direction under the control of said selectively operative means.

7. A shifting mechanism for variable speed gearing embodying therein an engine clutch, means operative to set and release said clutch, a plurality of shifting rods adapted respectively to impart variable movement to a movable member of a transmission gear system, actuating means having a normal tendency to move both of said rods, connections between said means and the means operative to set and release the engine clutch, whereby said means are permitted to operate when the clutch is set and are restored to normal when said clutch is released, selectively operative means common to both of said rods, whereby the operative effect of said actuating means upon said rods may be predetermined, means independent of said connections whereby said actuating means may be made inoperative, or held in a neutral position, a controller for said selectively operative means, and means carried by said rods respectively and adapted to be acted upon by said selectively operative means whereby said rods respectively may be moved in either direction under the control of said selectively operative means.

8. A shifting mechanism for variable speed gearing embodying therein an engine clutch, means operative to set and release said clutch, a plurality of shifting rods adapted respectively to impart variable movement to a movable member of a transmission gear system, actuating means having a normal tendency to move both of said rods, connections between said means and the means operative to set and release the engine clutch, whereby said means are permitted to operate when the clutch is set and are restored to normal when said clutch is released, means whereby the movements of said actuating means are timed with relation to the movements of said means for controlling said clutch, whereby said actuating means are inoperative to move said rods while the clutch is set, selectively operative means common to both of said rods, whereby the operative effect of said actuating means upon said rods may be predetermined, means independent of said connections whereby said actuating means may be made inoperative, or held in a neutral position, a controller for said selectively operative means, and means carried by said rods respectively and adapted to be acted upon by said selectively operative means, whereby said rods respectively may be moved in either direction under the control of said selectively operative means.

9. A shifting mechanism for variable speed gearing embodying therein an engine clutch, means operative to set and release said clutch, a shifting rod operative upon a movable member of a transmission gear system, oppositely disposed members, an elastic medium adapted to actuate said members, means acting upon said members to restore them to normal after each actuation thereof, connections between said last named means and the actuating mechanism for the clutch of an engine, connecting means carried by each of said members, means coöperating with said connecting means respectively whereby said members selectively may be permitted to move or be held against movement, a controller whereby said connecting means may be set, to determine the operative effect of said members, and means carried by said shifting rod and adapted to be acted upon by said connecting means whereby said rod may be moved in either direction under the control of said members.

10. A shifting mechanism for variable speed gearing embodying therein an engine clutch, means operative to set and release said clutch, a shifting rod operative upon a movable member of a transmission gear system, oppositely disposed members, a spring seated between and acting simultaneously upon said members, means acting upon said members to restore them to normal after each actuation thereof, connections between said last named means and the actuating mechanism for the clutch of an engine, connecting means carried by each of said members, means coöperating with said connecting means respectively whereby said members selectively may be permitted to move or be held against movement, a controller whereby said connecting means may be set, whereby to determine the operative effect of said members, and means carried by said shifting rod and adapted to be acted upon by said connecting means whereby said rod may be moved in either direction under the control of said members.

11. A shifting mechanism for variable speed gearing embodying therein an engine clutch, means operative to set and release said clutch, a shifting rod operative upon a movable member of a transmission gear system, oppositely disposed members, an elastic medium adapted to actuate said members, means acting upon said members to restore them to normal after each actuation thereof, connections between said last named means and the actuating mechanism for the clutch of an engine, a rotary connecting disk mounted upon each of said members, a guide stop adapted to prevent or permit movement of said disks respectively, said disks being adapted to coöperate with said guide stops, means carried by said rod and coöperating with said disks respectively, whereby said members selectively may be permitted to move or be held against movement, a controller whereby said connecting disks may be set, to determine the operative effect of said members, and means carried by said shifting rod and adapted to be acted upon by said connecting means, whereby said rod may be moved in either direction under the control of said members.

12. A shifting mechanism for variable speed gearing embodying therein an engine clutch, means operative to set and release said clutch, a shifting rod operative upon a movable member of a transmission gear system, oppositely disposed members, an elastic medium adapted to actuate said members, means acting upon said members to restore them to normal after each actuation thereof, connections between said last named means and the actuating mechanism for the clutch of an engine, whereby said members are permitted to operate when the clutch is set and are restored to normal when the clutch is released, means whereby the movements of said members are timed with relation to the movements of the means controlling said clutch, whereby said members are inoperative to move said rod while the clutch is set, connecting means carried by each of said members, means coöperating with said connecting means respectively whereby said members selectively may be permitted to move or be held against movement, a controller whereby said connecting means may be set, to determine the operative effect of said members, and means carried by said shifting rod and adapted to be acted upon by said connecting means whereby said rod may be moved in either direction under the control of said members.

13. A shifting mechanism for variable speed gearing embodying therein an engine clutch, means operative to set and release said clutch, a shifting rod operative upon a movable member of a transmission gear system, oppositely disposed members, an elastic medium adapted to actuate said members, means acting upon said members to restore them to normal after each actuation thereof, connections between said last named means and the actuating mechanism for the clutch of an engine, whereby said members are permitted to operate when the clutch is set and are restored to normal when the clutch is released, means independent of said connections whereby said members may be made inoperative, or held in a neutral position, connecting means carried by each of said members, means coöperating with said connecting means respectively whereby said members selectively may be permitted to move or be held against movement, a controller whereby said connecting means may be set, to determine the operative effect of said members, and means carried by said shifting rod and adapted to be acted upon by said connecting means, whereby said rod may be moved in either direction under the control of said members.

14. A shifting mechanism for variable speed gearing embodying therein an engine clutch, means operative to set and release said clutch, a shifting rod operative upon a movable member of a transmission gear system, oppositely disposed members adapted to be actuated by an elastic medium, means acting upon said members to restore them to normal after each actuation thereof, connections between said last named means and the actuating mechanism for the clutch of an engine, whereby said members are permitted to operate when the clutch is set and are restored to normal when the clutch is released, means whereby the movements of said members are timed with relation to the movements of the means controlling said clutch, whereby said members are inoperative to move said rod while the clutch is set, means independent of said connections whereby said members may be made inoperative, or be held in a neutral position, connecting means carried by each of said members, means coöperating with said connecting means respectively whereby said members selectively may be permitted to move or be held against movement, a controller whereby said connecting means may be set, to determine the operative effect of said members, and means carried by said shifting rod and adapted to be acted upon by said connecting means whereby said rod may be moved in either direction under the control of said members.

15. A shifting mechanism for variable speed gearing embodying therein an engine clutch, means operative to set and release said clutch, a plurality of shifting rods adapted to impart variable movement to movable members of a transmission gear system, oppositely disposed members adapted to be actuated by an elastic medium, means acting upon said members to restore them to normal after each actuation thereof, connections between said last named means and the actuating mechanism for the clutch of an engine, connecting means common to all of said rods, carried by each of said members, means coöperating with said connecting means respectively whereby said members selectively may be permitted to move or be held against movement, a controller whereby said connecting means may be set to determine the operative effect of said members, and means carried by each of said shifting rods and adapted to be acted on by said connecting means whereby any of said rods may be moved in either direction under the control of said members.

16. A shifting mechanism for variable speed gearing embodying therein an engine clutch, means operative to set and release said clutch, a plurality of shifting rods adapted to impart variable movement to movable members of a transmission gear system, oppositely disposed members adapted to be actuated by an elastic medium, means acting upon said members to restore them to normal after each actuation thereof, connections between said last named means and the actuating mechanism for the clutch of an engine, whereby said members are permitted to operate when the clutch is set and are restored to normal when the clutch is released, means whereby the movements of said members are timed with relation to the movements of said means for controlling said clutch, connecting means common to all of said rods, carried by each of said members, means coöperating with said connecting means respectively whereby said members selectively may be permitted to move or be held against movement, a controller whereby said connecting means may be set to determine the operative effect of said members, and means carried by each of said shifting rods and adapted to be acted upon by said connecting means whereby any of said rods may be moved in either direction under the control of said members.

17. A shifting mechanism for variable speed gearing embodying therein an engine clutch, means operative to set and release said clutch, a plurality of shifting rods adapted to impart variable movement to movable members of a transmission gear system, oppositely disposed members, an elastic medium adapted to actuate said members, means acting upon said members to restore them to normal after each actuation thereof, connections between said last named means and the actuating mechanism for the clutch of an engine, connecting means common to all of said rods, carried by each of said members, means coöperating with said connecting means respectively whereby said members selectively may be permitted to move or be held against movement, means independent of said means coöperating with said connecting means, whereby said actuating means may be made inoperative, or held in a neutral position, a controller whereby said connecting means may be set to determine the operative effect of said members, and means carried by each of said shifting rods and adapted to be acted upon by said connecting means whereby any of said rods may be moved in either direction under the control of said members.

18. A shifting mechanism for variable speed gearing embodying therein an engine clutch, means operative to set and release said clutch, a plurality of shifting rods adapted to impart variable movement to movable members of a transmission gear system, oppositely disposed members, an elastic medium adapted to actuate said members, means acting upon said members to restore them to normal after each actuation thereof, connections between said last named means and the actuating mechanism for the clutch of an engine, whereby said members are permitted to operate when the clutch is set and are restored to normal when the clutch is released, means whereby the movements of said members are timed with relation to the movements of said means for controlling said clutch, connecting means common to all of said rods, carried by each of said members, means coöperating with said connecting means respectively whereby said members selectively may be permitted to move or be held against movement, means independent of said means coöperating with said connecting means, whereby said actuating means may be made inoperative, or held in a neutral position, a controller whereby said connecting means may be set to determine the operative effect of said members, and means carried by each of said shifting rods and adapted to be acted upon by said connecting means, whereby any of said rods may be moved in either direction under the control of said members.

19. A shifting mechanism for variable speed gearing, embodying therein an engine clutch, means operative to set and release said clutch, a shifting rod adapted to impart variable movement to a movable member of a transmission gearing system, oppositely disposed slidable members, an elastic medium adapted to actuate said members, means acting on said members to restore said members to normal after each actuation thereof, connections between said last named means and the actuating mechanism for the clutch of an engine, a rotary connecting disk carried by and movable with each of said slidable members, means whereby said disks may be turned, a controller actuating said last named means, whereby the disks may be set to determine the operative effect of said slidable members, fixed means adapted to be engaged by said disks, said disks being provided with slots adapted to pass said fixed means, and forked blocks carried by said rod and normally adapted to straddle said disks, said disks respectively being provided with contact surfaces and clearances, whereby said rod may be moved in either direction under the control of said members.

20. A shifting mechanism for variable speed gearing, embodying therein an engine clutch, means operative to set and release said clutch, a shifting rod adapted to impart variable movement to a movable member of a transmission gearing system, oppositely disposed slidable members, an elastic medium adapted to actuate said members, means acting on said members to restore said members to normal after each actuation thereof, connections between said last named means and the actuating mechanism for the clutch of an engine, a rotary connecting disk carried by and movable with each of said slidable members, means whereby said disks may be turned, a controller actuating said last named means, whereby the disks may be set to determine the operative effect of said slidable members, elongated guide stops adapted to be engaged by said disks, said disks being provided with slots adapted to straddle and slide along said guide stops, whereby rotary movement of said disks is prevented after either of said members has actuated any of said rods, and forked blocks carried by said rod and normally adapted to straddle said disks, said disks respectively being provided with contact surfaces and clearances, whereby said rod may be moved in either direction under the control of said members.

21. A shifting mechanism for variable speed gearing embodying therein an engine clutch, means operative to set and release said clutch, a shifting rod adapted to impart variable movement to movable members of a transmission gearing system, a slidable rod parallel therewith and connected with the lever for controlling an engine clutch, oppositely disposed members slidably mounted on said last named rod, a spring seated between and acting against both of said members, a cross head acting on one of said members, and carried by said slidable rod, a block slidably mounted upon said slidable rod, link and lever connections between said cross head and said block, whereby said spring will be tensioned when the engine clutch is released, and released when said clutch is set, connecting means carried by each of said members, means coöperating with said connecting means respectively whereby said members selectively may be permitted to move or be held against movement, a controller whereby said connecting means may be set, to determine the operative effect of said members, and means carried by said shifting rod and adapted to be acted upon by said connecting means whereby said rod may be moved in either direction under the control of said members.

22. A shifting mechanism for variable speed gearing embodying therein an engine clutch, means operative to set and release said clutch, a shifting rod adapted to impart variable movement to movable members of a transmission gearing system, a slidable rod parallel therewith and connected with the lever for controlling an engine clutch, oppositely disposed members slidably mounted on said last named rod, a spring seated between and acting against both of said members, a cross head acting on one of said members, and carried by said slidable rod, a block slidably mounted upon said slidable rod, link and lever connections between said cross head and said block, whereby said spring will be tensioned when the engine clutch is released, and released when said clutch is set, a rotary connecting disk carried by and movable with each of said slidable members, means whereby said disks may be turned, a controller actuating said last named means, whereby the disks may be set to determine the operative effect of said slidable members, guide stops having a fixed relation to and adapted to be engaged by said disks, said disks being provided with slots adapted to pass said guide stops, forked blocks carried by said shifting rod and normally adapted to straddle said disks, said disks respectively being provided with contact surfaces and clearances whereby said rod may be moved in either direction under the control of said members, and means carried by said block and said cross head, and adapted to engage said forked blocks respectively, whereby clearance is provided between said disks and said blocks.

23. A shifting mechanism for variable speed gearing embodying therein an engine clutch, means operative to set and release said clutch, a plurality of shifting rods adapted to impart variable movement to a movable member of a transmission gearing system, oppositely disposed slidable members adapted to be actuated by an elastic medium, means acting on said members to restore said members to normal after each actuation thereof, connections between said last named means and the actuating mechanism for the clutch of an engine, a rotary connecting disk carried by and movable with each of said slidable members, common to all of said rods, means whereby said disks may be turned, a controller actuating said last named means, whereby the disks may be set to determine the operative effect of said slidable members, guide stops having a fixed relation to and adapted to be engaged by said disks, said disks being provided with slots adapted to pass said guide stops, and forked blocks carried by all of said rods and normally adapted to straddle said disks, said disks respectively being provided with contact surfaces and clearances, whereby any of said rods may be moved in either direction under the control of said members.

24. A shifting mechanism for variable speed gearing embodying therein an engine clutch, means operative to set and release said clutch, a plurality of shifting rods adapted to impart variable movement to movable members of a transmission gearing system, a slidable rod parallel therewith and connected with the lever for controlling an engine clutch, oppositely disposed members slidably mounted on said last named rod, a spring seated between and acting against both of said members, a cross head acting on one of said members, and carried by said slidable rod, a block slidably mounted upon said slidable rod, links and lever connections between said cross head and said block, whereby said spring will be tensioned when the engine clutch is released, and released when said clutch is set, a rotary connecting disk carried by and movable with each of said slidable members, common to all of said rods, means whereby said disk may be turned, a controller actuating said last named means, whereby said disks may be set to determine the operative effect of said slidable members, guide stops having a fixed relation to and adapted to be engaged by, said disks, said disks being provided with slots adapted to pass said fixed means, forked blocks carried by each of said shifting rods and normally adapted to straddle said disks, said disks respectively being provided with contact surfaces and clearances whereby any of said rods may be moved in either direction under the control of said members, and means carried by said block and said cross head, and adapted to engage said forked blocks respectively, whereby clearance is provided between said disks and said blocks.

25. A shifting mechanism for variable speed gearing embodying therein an engine clutch, means operative to set and release said clutch, oppositely disposed, slidable actuating members, a plurality of shifting rods, blocks carried thereby, means adapted to control the movements of said members and said rods, consisting of rotatable disks carried by said members respectively, and stops coöperating therewith, said disks respectively being provided with a plurality of slots adapted to pass said stops respectively, a plurality of contact surfaces adapted to engage said stops or said blocks, and a plurality of clearances adapted to pass said blocks, the slots and clearances of one disk being set opposite the contact surfaces of the other, and means simultaneously rotating said disks.

26. A shifting mechanism for variable speed gearing embodying therein an engine clutch, means operative to set and release said clutch, a shifting rod, a plurality of differentially operative actuating members, means whereby said members selectively may be operatively connected to said rod, a spring seated between and acting on said members, means determining the operative effect of said members, means whereby said members may be forced toward each other to tension said spring, or released to permit movement thereof by said spring, and connections between said last named means and the controlling mechanism for the clutch of an engine, whereby the shifting of the gears will be controlled by said last named mechanism.

In witness whereof, I have hereunto affixed my signature, in the presence of two subscribing witnesses, this 21st day of August, 1913.

GEORGE W. BUNGAY.

Witnesses:
CLARICE FRANCK,
EUGENE WENING.